Figure 1:
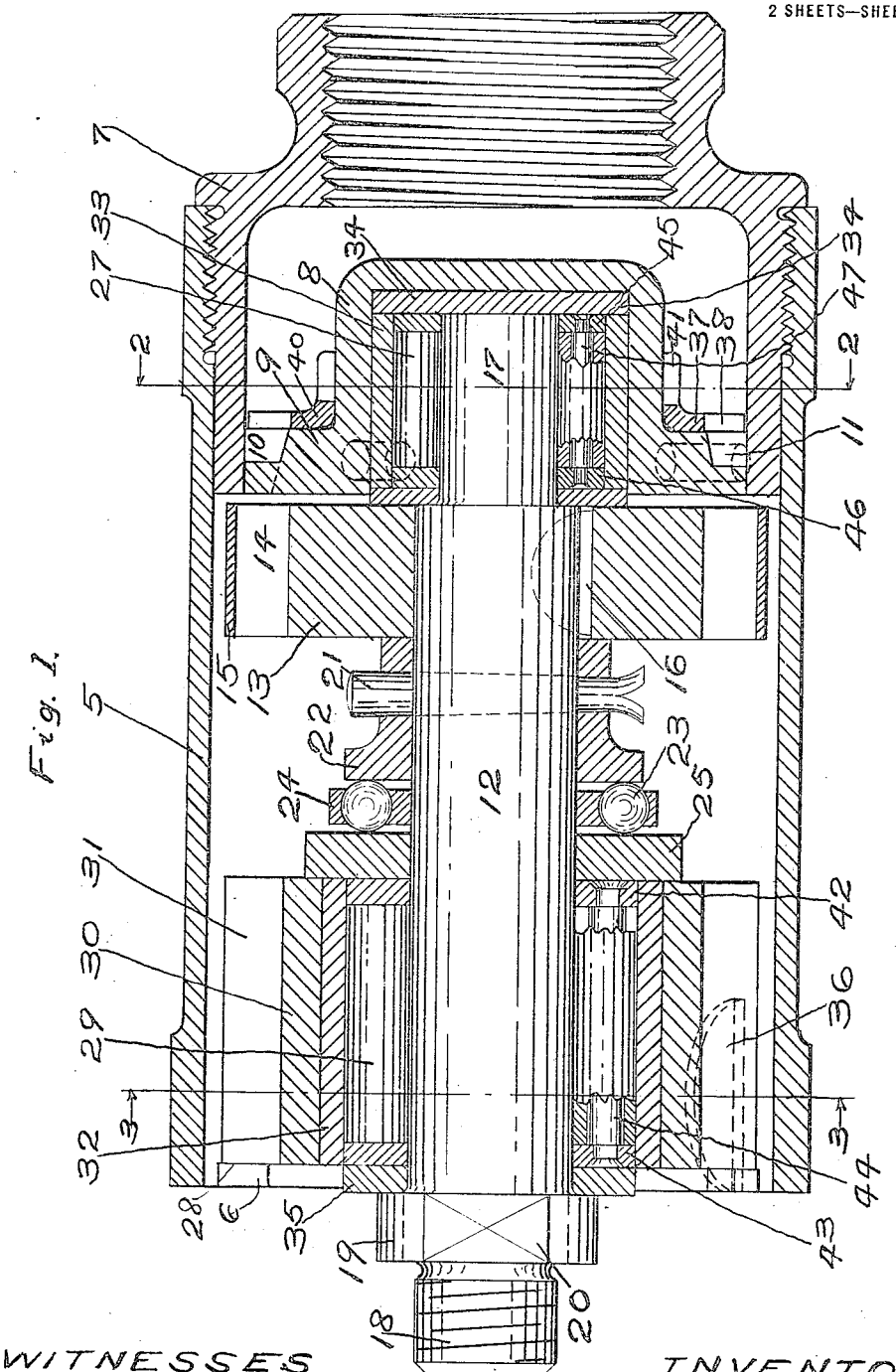

P. J. DARLINGTON.
ROTARY MOTOR.
APPLICATION FILED APR. 1, 1915.

1,225,224.

Patented May 8, 1917.
2 SHEETS—SHEET 1.

WITNESSES

INVENTOR
Philip J. Darlington

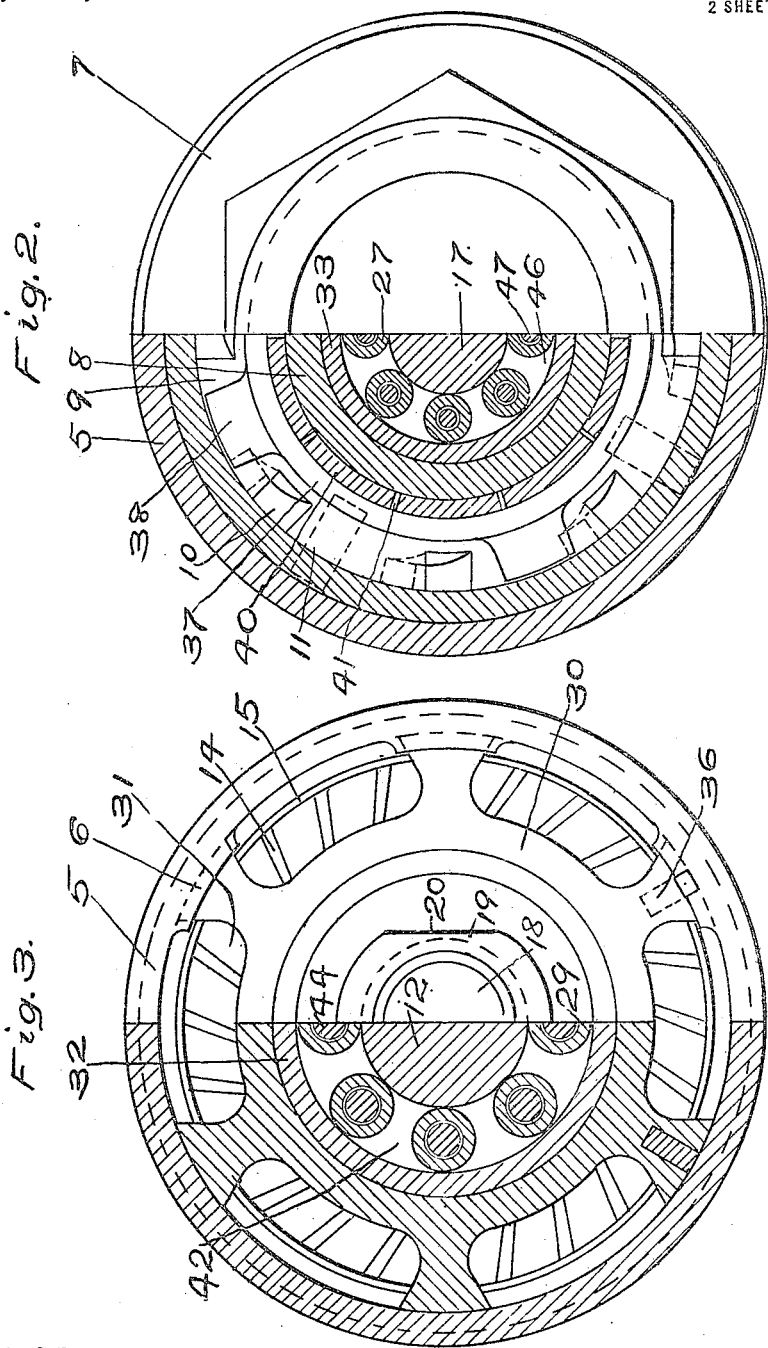

UNITED STATES PATENT OFFICE.

PHILIP J. DARLINGTON, OF HARTFORD, CONNECTICUT, ASSIGNOR TO THE ROTO COMPANY, OF HARTFORD, CONNECTICUT, A CORPORATION OF CONNECTICUT.

ROTARY MOTOR.

1,225,224.  Specification of Letters Patent.  Patented May 8, 1917.

Application filed April 1, 1915. Serial No. 18,595.

*To all whom it may concern:*

Be it known that I, PHILIP J. DARLINGTON, a citizen of the United States, residing at Hartford, in the county of Hartford and State of Connecticut, have invented new and useful Improvements in Rotary Motors, of which the following is a specification.

This invention relates to rotary motors of the type employed for driving tube cleaning tools.

The object of the invention is to simplify and cheapen the construction of motors of this class, and at the same time increase their efficiency and render them longer lived and more easily repaired when the wearing parts become worn.

In the accompanying drawings Figure 1 shows a central longitudinal section of a motor constructed according to this invention. Fig. 2 is a rear view and half section on the line 2—2 of Fig. 1. Fig. 3 is a front view and half section on the line 3—3 of Fig. 1.

The outer shell or casing 5 has internal projections 6 at the front end, forming internal shoulders 28, and is threaded at the rear end to receive a hollow head 7, which is internally threaded at its rear end to receive a fluid supply pipe.

The hollow head 7 is closed at its forward end by an inner head 8, having a forward flange 9 which is formed with inclined nozzle passages 10. Flange 9 is preferably forced tightly into head 7 and further secured by radial pins 11.

A rotary shaft 12 carries a turbine wheel 13, which is formed with turbine buckets 14 surrounded by a band 15. The inclined buckets 14 and band 15 inclose turbine openings, which are inclined in an opposite direction to turbine nozzles 10, forming therewith the usual turbine elements.

Wheel 13 is further secured on shaft 12 by key 16.

The rear end of shaft 12 has a reduced journal portion 17. The forward end of shaft 12 has a threaded projection 18 to receive the cleaning tool and a collar 19, preferably integral with shaft 12, formed with flats 20 to receive a wrench. A thrust collar 22 is held in place on shaft 12 by a tapered split pin 21.

The rear end face of collar 22 bears upon wheel 13 to prevent it slipping forward. The front end face of collar 22 bears upon thrust bearing balls 23, which are loosely held in place by a ball cage 24, and roll upon a flat thrust washer 25.

The front end of the casing is closed by a front head 30, which fits inside the shell, resting against shoulders 28 of projections 6. Front head 30 is formed with longitudinal water passages 31 and supports washer 25 against forward movement.

The forward portion of shaft 12 is carried on bearing rollers 29 supported in the front head 30, preferably with a removable bush 32. The rear journal portion 17 of shaft 12 is supported by bearing rollers 27 in the inner head 8, preferably by removable bush 33.

Rear thrust of shaft 12 is carried upon a thrust disk 34. A washer 35, bearing upon the rear face of collar 19, closes the front end of the annular space occupied by bearing rollers 29.

A key 36, set into front head 30 and passing through a key-way in projection 6, prevents the front head turning in the shell.

A nozzle shut-off ring 40 fits rotatably around inner head 8 and has a flange 37 bearing against the rear face of flange 9. Flange 37 has radially projecting arms or extensions 38 of width slightly greater than the open mouth of nozzle 10.

The number of arms 38 is less than the number of nozzles 10, preferably one-half as many, and equally spaced around the circumference.

In the normal position of ring 40, arms 38 lie between nozzles 10 and all of the nozzles are uncovered and fully open for the greatest power and fluid consumption of the motor.

By turning ring 40 until arms 38 fully cover some of the nozzles 10, the covered nozzles are entirely closed, reducing the power and fluid consumption of the motor, while leaving other nozzles fully open, allowing unrestricted passage of the water through that reduced number of nozzles, and producing a reduced power and speed of the motor at much higher efficiency than would be the case if a reduction of speed and power had been accomplished in the usual way of reducing the water pressure.

The adjustment, by rotation of ring 40, may be accomplished by reaching through the opening at the rear of head 7 with a rod or other suitable tool. Slots 41 are cut from the rear face a part of the distance forward in ring 40 and the metal between the slots sprung inward to give the necessary friction on the cylindrical surface of head 8 to retain ring 40 in the desired position after its adjustment thereto.

Bearing rollers 29 are supported in a bearing cage formed of two rings 42 and 43 connected by posts 44 passing through holes in the rollers.

Rollers 27 are similarly supported by a corresponding cage formed of rings 45 and 46 connected by rods 47 passing through holes in the rollers.

In operation, the fluid jets, through the nozzle passages, strike upon the turbine buckets and rotate the shaft.

The shaft is supported radially by the bearing rollers, while the forward pull or end load is carried on the bearing balls. When the rollers become worn and allow radial movement or wabbling of the shaft, the balls are free to follow such radial movement without being subjected to considerable additional stress or wear. By carrying the radial load and end load on independent anti-friction bearings each of the two anti-friction elements can be best suited to its own purpose and protected from extra strain from wear of the other bearing element.

The cost of water is sometimes a very large item in the operation of motors of this type and frequently the normal power of the motor is greatly in excess of the power needed or desired for the work to be done. In such case, the motor can be unscrewed from the supply pipe and a rod used through the supply opening of the motor to turn the shut-off ring so as to cover one-half of the nozzles and thereby reduce the water consumption of the motor one-half while leaving its efficiency substantially unchanged.

I claim as my invention:—

In a rotary turbine motor, a hollow cylindrical casing with internal projections at its front end, a front head having radial arms abutting on said projections and a key seated in one of said arms and entering a key-way in one of said projections to retain said arms in angular position to register with said projections.

In testimony whereof I have signed my name to this specification in the presence of two subscribing witnesses this 27th day of March, 1915.

PHILIP J. DARLINGTON.

Witnesses:
F. SPENCER,
B. A. MOHR.

Copies of this patent may be obtained for five cents each, by addressing the "Commissioner of Patents, Washington, D. C."